May 25, 1965    J. DURST    3,185,059
POSITIONING ARRANGEMENT FOR AN OBJECTIVE LENS
Filed Sept. 6, 1961
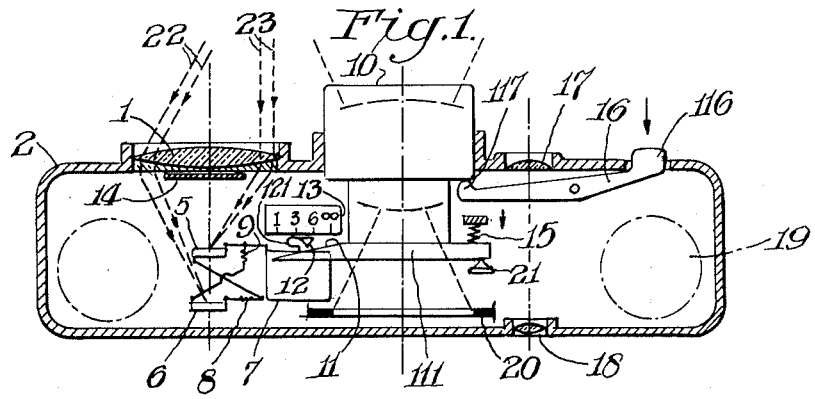
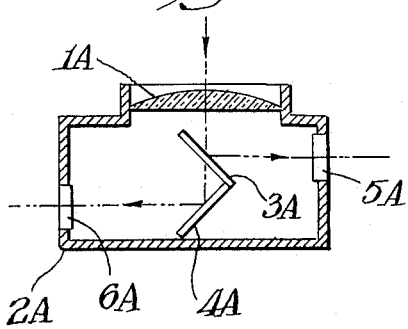 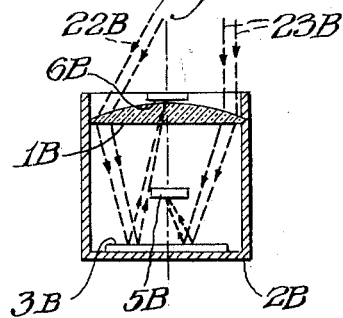
INVENTOR:
Julius Durst,
BY Connolly and Hutz
ATTORNEYS United States Patent Office 3,185,059
Patented May 25, 1965

3,185,059
POSITIONING ARRANGEMENT FOR AN
OBJECTIVE LENS
Julius Durst, Brixen, near Bozen, Italy, assignor to Julius Durst, Luis Oberrauch, and Heinz Oberrauch, Bozen, Italy
Filed Sept. 6, 1961, Ser. No. 136,717
Claims priority, application Italy, Oct. 7, 1960, 17,314/60
13 Claims. (Cl. 95—44)

This invention relates to an arrangement for positioning an objective lens at the optimum focal distance from the photosensitive material that it is exposing, and it more particularly relates to such an arrangement for a photographic camera.

The optimum focal distance of an objective lens from the photosensitive material that it is exposing varies in accordance with the distance from which the preponderance of light is received. When, for example, most of the light rays are received by a photographic objective lens from objects at an infinite distance, its optimum focal distance is slightly shorter than it is when the preponderance of light rays is received from nearer objects. Optimum focusing of the image directed from the objective lens upon the film of a camera therefore requires a slight shifting of the objective lens assembly relatively closer to the film for more distant subjects and farther from the film for relatively nearer objects. This adjustment is generally disregarded in most cameras, but its accommodation can significantly sharpen the photographed image.

Various radar systems have been proposed for accomplishing an adjustment of the distance of a photographic objective lens relative to the photosensitive material that it is exposing; however, these radar systems are expensive and bulky, which makes them rather impractical to incorporate in the average still, motion picture or even television camera.

An object of this invention is to provide a relatively simple and economical arrangement for adjusting an objective lens to the optimum focal distance from the photosensitive material that it is exposing in accordance with the distance from which it is receiving most of its light.

Another object is to provide a substantially automatic arrangement of this type for a photographic camera.

In accordance with this invention a light differentiating means having a field of view substantially corresponding to that of the objective lens and viewfinder separates and directs the light received from relatively nearer and farther objects upon separate photocells which are connected to a transducer in a manner which causes its output to represent a function of the distance of the principal subject of the objective lens. This output is then used to adjust the objective lens to the optimum focal distance from the photosensitive material. If more light is being received by a photographic objective lens from distant objects, such as at infinite distances, it is thereby adjusted closer to the film; whereas when nearer subject matter predominates it is accordingly moved farther away from the film. Conditions as to lighting and as to field of view should be such for ideal operation of the device that the overall brilliancy of the light collected by the light differentiating means from near and afar should be substantially uniform.

The aforementioned light differentiating means must be arranged to prevent changes in overall field brilliancy from affecting its separation of the light received from farther and nearer objects, and the photocells are accordingly advantageously connected to cause their outputs to oppose each other thereby canceling out the effect of changes in overall field illumination. The sensitivity of a light differentiating means formed by a convergent lens can be enhanced by masking its central area and utilizing only its rim area, which deviates light rays received from nearer and farther subjects considerably different amounts.

Reflectors may also be arranged at different distances along the optical axis of a light differentiating lens at varying distances for reflecting the light from near and far sources upon different photocells.

The photocell and transducer may be provided by any system which permits the light energy received to be changed into mechanical positioning of the objective lens. When for example a photoelectric cell is connected to a galvanometer in a photographic camera, the angle of deflection of its needle is utilized to govern the distance that the objective is positioned from the film. The objective lens assembly may for example be resiliently biased toward one extremity of adjustment and moved in accordance with the deflection of the galvanometer to its optimum position against this bias. Movement of the lens assembly may for example be accomplished by a manually-operated lever which engages an inclined surface upon the objective lens assembly with the needle of the galvanometer.

Novel features and advantages of the present invention will become apparent to one skilled in the art from a reading of the following description in conjunction with the accompanying drawings wherein similar reference characters refer to similar parts and in which:

FIG. 1 is a schematic plan view of one embodiment of this invention;

FIG. 2 is a schematic plan view of a modification of the light differentiating means of the embodiment shown in FIG. 1; and FIG. 3 is a schematically plan view of another light differentiating means of the embodiment shown in FIG. 1.

In FIG. 1 is shown a camera incorporating this invention. This camera includes a housing 2 upon which is movably mounted a photographic objective lens assembly 10 and an apertured film support or plate 20. The film (not shown) is wound upon take-up roller 19 and thereby pulled across plate 20 for exposure by the light directed through objective lens assembly 10. A light differentiating means includes a light separating objective lens 1 which is for example a plano-convex lens whose field of view substantially corresponds to that of objective lens 10 and that of the viewfinder provided by lenses 17 and 18.

The central area of lens 1 is masked by solid diaphragm 14, and its exposed rim area focuses rays from nearer objects much farther away from it than rays from farther objects. These light rays are respectively schematically indicated by broken lines and arrows 22 and 23. Light rays 22 from nearer objects are accordingly focused upon photocell 6, and light rays 23 from farther or infinitely distant objects are focused upon photocell 5. Photocells 5 and 6 are connected in the circuit to galvanometer 7 in a manner which causes their outputs to act in opposition to each other. Compensating resistors 8 and 9 permit the device to be properly calibrated and adjusted.

The indicating pointer 12 of galvanometer 7 is supported upon resilient arm 12 to permit it to be flexed without damaging the sensitive galvanometer mechanism. Indicator or pointer 12 is moved by the galvanometer mechanism across indicating scale plate 13 which is calibrated with marks and indicia corresponding to the distance of objects from which the light entering objective lens assembly 10 predominates.

A bar 111 is attached to objective lens assembly 10, and it includes an inclined surface 11 disposed adjacent the path of movement of galvanometer indicator 12. A spring 15 reacts between a fixed portion of casing 2 and bar 111 to resiliently urge bar surface 11 into contact with fixed stop element 21 which is also secured to casing 2.

A manually operable lever 16 having end 116 extending outside of casing 2 has its inner end 117 in contact with part of objective lens assembly 10 in a direction to move objective lens assembly 10 away from apertured film plate 20. When galvanometer pointer 12 is in the infinity position, actuation of lever 116 is arrested almost immediately by engagment of pointer 12 between the upper end of inclined surface 11 and distance scale plate 13. As shown in FIG. 1, objective lens assembly 10 is therefore originally maintained in the position of optimum focus of light rays predominately received from infinitely distant objects. However, as pointer 12 is moved to positions indicating reception of light predominately from nearer objects such as approximately at 4½ meters as shown in FIG. 1, objective lens assembly 10 and bar 111 are moved a greater distance away from the film and its support plate 20 upon actuation of lever 16 before pointer 12 is engaged. This accordingly provides an optimum effective focal distance for the objective lens from the film in accordance with the distance of objects from which objective lens 10 is receiving its major amount of light.

The connection of photocells 5 and 6 in opposition with each other cancels out any effect which is solely due to a general increase in brilliance of the overall field. This provides a fairly sensitive adjustment of galvanometer indicator 12 to the position opposite scale 13 which corresponds to the distance from which most of the objects from which the objective lens receives light are disposed. The movement of objective lens assembly 10 in response to actuation of lever 16 and subsequent arresting of inclined surface 11 of bar 111 against galvanometer indicator 12, therefore, automatically distances objective lens assembly 10 away from the film at a distance which provides optimum sharpness of focus of the image upon the film (not shown).

In FIG. 2 is shown another light differentiating arrangement in which a pair of mirrors 3A and 4A are arranged along the optical axis of differentiating lens 1A for respectively reflecting light rays upon photocells 5A and 6A. Mirror 3A is semireflective, and mirror 4A is totally reflective thereby permitting the effect of centrally directed rays to substantially cancel themselves out. Rays from relatively nearer objects impinge upon mirror 4A whereas rays from more distant objects such as infinite distant objects impinge upon mirror 3A. Photocells 5A and 6A may therefore be connected in a manner similar to that of photocells 5 and 6 shown in FIG. 1 for actuating galvanometer 7.

In FIG. 3 is shown another light differentiating arrangement in which a differentiating objective 1B having a longer focal length is utilized by reflecting light rays transmitted through its rim areas back toward it by means of mirror 3B toward photocells 5B and 6B. The backs of photocells 5B and 6B facing the direction from which the light rays originate are made opaque, and the back of photocell 6B acts as a mask for the central area for differentiating lens 1B as previously described in FIG. 1. As shown in FIG. 3, light rays 22B from nearer objects are deviated by the rim area of lens 1B at angles which causes mirror 3B to reflect them against photocell 6B, whereas light rays 3B from infinitely distant objects are reflected against photocell 5B. Photocells 5B and 6B are connected to a galvanometer in the manner described in FIG. 1 with reference to photocells 5 and 6 to permit the galvanometer to be actuated in accordance with the reception of light from nearer or more distant objects.

What is claimed is:

1. An arrangement for positioning an objective lens at the optimum focal distance from photosensitive material that it is exposing, said arrangement comprising a pair of photocells, a transducer, a light differentiating means having a field of view substantially corresponding to that of said objective lens, said light differentiating means being arranged to direct light from relatively distant objects upon one of said photocells and light rays from relatively nearer objects upon the other of said photocells, circuit means connecting said photocells to said transducer in a manner which causes the output of said transducer to represent a function of the relative amounts of light received by said objective lens from said nearer and said distant objects, said objective lens being mounted to be movable from positions closer and farther from said photosensitive material, adjusting means connected with said objective lens and said transducer for adjusting said objective lens to said optimum focal distance in accordance with the output of said transducer, said transducer being a galvanometer, said galvanometer including a movable indicator, and said objective lens having a surface which engages said movable indicator for adjusting said objective lens to its optimum position.

2. An arrangement as set forth in claim 1 wherein said transducer is a galvanometer, said galvanometer including a movable indicator and said objective lens having a surface which engages said movable indicator for adjusting said objective lens to its optimum position.

3. An arrangement as set forth in claim 2 wherein said surface upon said objective lens comprises an inclined surface, a supporting surface being disposed upon the opposite side of said indicator from said inclined surface, and said adjusting means being arranged to move said objective lens and said surface toward said indicator whereby said objective lens is arrested by said indicator and supporting surface in accordance with the position of said indicator.

4. An arrangement as set forth in claim 3 wherein said adjusting means comprises a lever rotatably mounted upon said camera, one end of said lever being connected with said objective lens, and the other side of said lever being arranged to be accessible for manual actuation.

5. An arrangement as set forth in claim 4 wherein said indicator comprises a pointer, said pointer being resiliently connected to said galvanometer, said objective lens assembly being resiliently biased towards said photosensitive material at the optimum focal distance for relatively distant objects, and said lever being arranged for moving said objective lens assembly away from said photosensitive material until said surface contacts said galvanometer pointer.

6. An arrangement as set forth in claim 1 wherein said circuit connects said photocells in opposition to each other in said galvanometer circuit whereby variations in overall field illumination are cancelled.

7. An arrangement as set forth in claim 1 wherein said photocells comprise photoelectric cathodes and amplifiers.

8. An arrangement as set forth in claim 1 wherein said light differentiating means comprises a convergent lens, said photocells for receiving said light rays from relatively distant and nearer objects being disposed along the optical axis of said convergent lens respectively nearer and farther from said convergent lens, and an opaque diaphragm masking the central portion of said convergent lens for utilizing only the rim area of said convergent lens for separately directing said light upon said photocells.

9. An arrangement as set forth in claim 8 wherein a mirror is disposed along said optical axis of said convergent lens for reflecting said light rays back toward said convergent lens, said photocell for receiving said light from said relatively nearer objects being positioned relatively farther from said mirror than said photocell for receiving said light from relatively farther objects, and the surfaces of said photocells disposed away from said mirror being light opaque for masking the central area of said convergent lens for providing said opaque diaphragm.

10. An arrangement as set forth in claim 1 wherein said light differentiating means includes a convergent lens, reflective means being disposed along the optical axis of said convergent lens, and said reflective means being arranged to direct said light rays from said relatively distant objects upon one of said photocells and said light rays from said relatively nearer objects upon the other of said photocells.

11. An arrangement as set forth in claim 10 wherein said reflective means comprises a mirror disposed substantially perpendicular to said optical axis of said convergent lens, and said photocells being disposed at varying distances from said mirror along the optical axis of said convergent lens for receiving said light rays from said mirror and for masking the central area of said convergent lens.

12. An arrangement as set forth in claim 10 wherein said reflective means comprises a pair of mirrors disposed at angles across said optical axis of said convergent lens for directing said light rays upon said photocells, said one of said mirrors being closer to said convergent lens than said other, and said one of said mirrors being semi-transparent to permit part of the light rays impinging upon it to pass through to the other of said mirrors for permitting the effect of any variation in total field illumination to substantially cancel.

13. An arrangement as set forth in claim 12 wherein said mirrors are disposed substantially at 45° angles across said optical axis.

References Cited by the Examiner
UNITED STATES PATENTS 2,968,994  1/61  Shurcliff _____ 88—39
3,037,423  6/62  Shurcliff _____ 88—26

NORTON ANSHER, *Primary Examiner.*

JOHN M. HORAN, *Examiner.*